United States Patent [19]

Porco

[11] Patent Number: 4,473,619
[45] Date of Patent: Sep. 25, 1984

[54] MAGNETIC AUDIO RECORDING TAPE AND METHOD OF PREPARATION THEREOF

[76] Inventor: Daniel A. Porco, 1050 5th Ave., New York, N.Y. 10028

[21] Appl. No.: 460,475

[22] Filed: Jan. 24, 1983

[51] Int. Cl.$^3$ ............................................. H01F 10/02
[52] U.S. Cl. .................................... 428/403; 427/48; 427/127; 427/128; 427/130; 428/694; 428/900
[58] Field of Search ................ 427/48, 127, 128, 130; 428/403, 694, 900

[56] References Cited

U.S. PATENT DOCUMENTS

| | | | |
|---|---|---|---|
| 3,790,407 | 2/1974 | Merten et al. | 117/240 |
| 3,949,386 | 4/1976 | Klokholm et al. | 340/174 TF |
| 4,034,133 | 7/1977 | Fleck et al. | 428/64 |
| 4,034,134 | 7/1977 | Gregorian et al. | 428/86 |
| 4,047,982 | 9/1977 | Sagawa et al. | 148/101 |
| 4,097,620 | 6/1978 | Lu | 427/127 |
| 4,145,301 | 3/1979 | Bruylants et al. | 252/62.56 |
| 4,165,410 | 8/1979 | Blank | 428/539 |
| 4,332,834 | 6/1982 | Takei | 427/48 |

OTHER PUBLICATIONS

Fayling & Benson, "Magnetic Recording Properties of SmCo$_5$", *IEEE Transactions on Magnetics*, vol. MAG. 14, No. 5, Dec., 1978, (See Applicant Disclosure p. 4, lines 15-30).

*Primary Examiner*—Bernard D. Pianalto
*Attorney, Agent, or Firm*—Wallenstein, Wagner, Hattis, Strampel & Aubel

[57] ABSTRACT

An audio magnetic recording medium includes a magnetic material carrier backing and a layer of a magnetic material thereover comprising magnetic particles dispersed in a binder, the magnetic particles having a thin coating thereon of a rare earth-containing material, preferably samarium pentoxide. The amount of the rare earth-containing material in the recording medium is only a small percentage by weight of the coated magnetic particles so as not to adversely effect the erasability of the magnetic record to be recorded, but is of sufficient amount to improve the frequency response, signal to noise ratio, or channel separation characteristics thereof.

19 Claims, 3 Drawing Figures

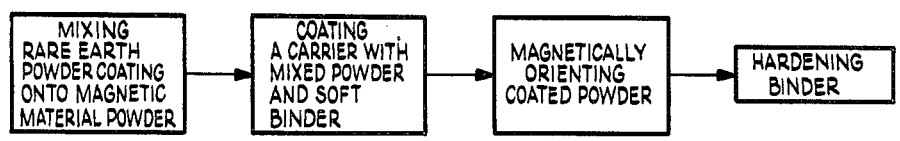
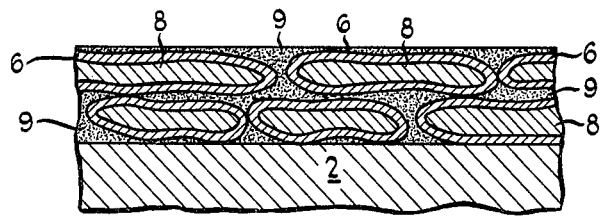
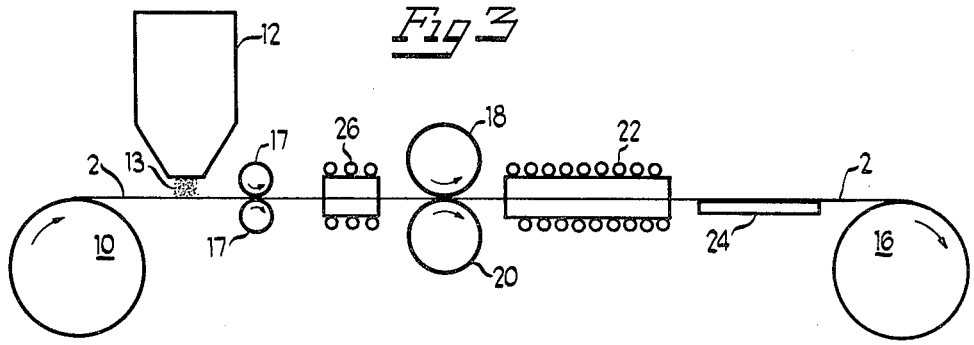

MAGNETIC AUDIO RECORDING TAPE AND METHOD OF PREPARATION THEREOF

BACKGROUND AND SUMMARY OF INVENTION

The progressive improvement in the quality of magnetic recording playback units, as well as the development of more complex signal processing capability in such units, have all served to place increased demands upon the quality of the recorded information placed upon magnetic tape. Since the quality of such information is intimately related to the magnetic properties of the tape itself, correspondingly increased demands have been placed upon the properties of magnetic tapes in general. In particular, increased demands are placed on such materials so as to provide for improved frequency response, signal to noise ratio, as well as channel separation for stereophonic or quadraphonic sound reproduction. Also, the increased use of tape cassettes for mini-computers has placed an additional public demand for extra-high quality tape.

It is a general objective in the fabrication of audio magnetic tape recording to produce a tape which is easily erasable, which means that it provides a coercive force low enough to be easily erased but high enough to avoid print-through between adjacent overlying wraps of tape wrapped around a dispensing and take-up spool.

It had been observed in the fabrication of ferrite permanent magnets used as loud speaker coil magnets, where permanence rather than erasability of the magnetized material is desired, that the admixture of a few percent of samarium pentoxide as a surface coating agent for the iron oxide particles forming the magnet resulted in improvement in the resulting magnet. In the process of fabricating the magnet, a powder mixture of the samarium pentoxide dispersed through the powdered iron oxide as a surface coating thereon was placed into a press, wherein the powder mixture was held in an appropriate form, and a magnetic field was applied to the confined mixture to provide a consistent grain orientation of the iron oxide crystals. This orientation was greatly improved as the direct result of the samarium coating, permitting the micron size ferric oxide platelets to better align each to the next. Pressure was applied to the powder matrix, and the matrix was sintered at high temperatures to form a self-supporting solid structure with a resulting improved permanent magnet.

The exact reason why samarium pentoxide in such small admixtures gives such improvement in the magnetic properties of these permanent magnets remains obscure. However, it was not heretofore considered useful to incorporate, as in the case of the present invention, a rare earth-containing material like samarium as a coating on the iron oxide particles forming an erasable magnetic recording medium for any purpose, let alone for the purpose of improving frequency response, signal to noise ratio, or channel separation of a magnetic audio recording tape.

The present invention involves the recognition that a rare earth-containing material, preferably samarium oxides in the preferred form of the invention, and other rare earth materials, like cerium, are useful as coatings of the magnetic recording material particles involved in erasable magnetic audio recording tapes and the like, significantly to improve frequency response, signal to noise ratio and/or channel separation therein, without significantly adversely affecting the erasability of such tapes. Such results are achieved when the rare earth-containing material is no more than about 2% and preferably less than about 1% of the weight of the coated magnetic particles involved. The rare earth-containing material is most advantageously samarium pentoxide.

The coating material is initially ball milled to a very fine powder. Next, it is mixed with the particles of magnetic recording material involved, preferably iron oxide, in very small amounts, and is then ball milled therewith to form a coating thereover. This mixture may be added to a standard uncured magnetic tape binder before being coated on a backing material, or applied with the binder upon one side of the backing material. The applied coating is subjected to a magnetic field to orient the particles of the recording material, and then the resultant coated tape is dried and cured in a conventional way.

The use of samarium compounds can be found in magnetic recording mediums for permanent magnetic documents like credit cards where a permanent not easily erasable rather than an easily erasable magnetic record is desired. Thus, there is disclosed in an article entitled "Magnetic Recording Properties of $SmCo_5$" by Fayling and Benson, IEEE Transactions on Magnetics, Volume Mag. 14, No. 5, December, 1978, the use of $SmCo_5$ as the recording medium (i.e. the samarium was not used as a coating for iron oxide ($Fe_2O_3$) magnetic particles). Also, the extremely high coercive force desired for this application makes such a disclosure completely inapplicable to erasable magnetic audio recording tapes.

Samarium has also been used as a composition element in magnetic material compositions, as distinguished from a coating on particles of iron oxide or the like. U.S. Pat. Nos. 4,145,301, 4,165,410, 4,047,982, 4,034,134, and 3,949,386 are examples where samarium is such an element.

U.S. Pat. No. 4,034,133 discloses the use of samarium trifluoride as a lubricant in a magnetic recording tape comprising magnetic particles dispersed in a polymeric binder. The samarium trifluoride is dispersed either throughout the binder-magnetic material composition or as a separate coating on the top thereof. The samarium trifluoride utilized is disclosed as being from $1\frac{1}{2}\%$ to 50% by weight of the entire coating (i.e. including the binder). There is no recognition of the use of the samarium trifluoride for a purpose other than as a lubricant (i.e. to reduce friction) with a magnetic recording or reproducing head).

BRIEF DESCRIPTION OF DRAWINGS

FIG. 1 is a flow chart showing the process of fabricating a magnetic audio recording tape in accordance with the invention;

FIG. 2 is a cross section microscopic view of the ferric oxide particles of the magnetic recording layer disposed on a tape and coated with the samarium-containing material constituting the unique aspect of the invention; and FIG. 3 is the corresponding mechanical arrangement for tape manufacture wherein adhesive-coated tape is dispensed from a dispensing roller to be coated by the samarium pentoxide coated ferric oxide powder to undergo grain orientation, to be calendered, to be fused to preserve orientation, and finally to be wound on a takeup roller.

DETAILED DESCRIPTION OF INVENTION

As a specific example of the invention, samarium pentoxide powder is extensively ball milled to form an extremely fine particle size. The samarium pentoxide powder is then mixed with ferric oxide powder of conventional particle size in a minute percentage by weight of the magnetic particles, such as 0.5% of the weight thereof. These two powders are then ball milled together, resulting in the iron oxide being coated with the samarium pentoxide.

The resulting coated iron oxide particles may then be mixed into a conventional uncured vinyl or polyurethene binder in the proportions commonly used for making magnetic tape, and then applied to a mylar tape base of a thickness, for example, of about 100 microinches. Alternatively, the binder may be pre-deposited upon the mylar base. A magnetic field is applied to the tape to orient the iron oxide particles. Finally, the binder is cured in a conventional way. The resulting web of recording tape may then be surface finished in a conventional way, or may be finished by calendering before curing.

FIG. 1 illustrates the different steps in the fabrication process just described. FIGS. 2 and 3 illustrates the magnetic recording tape made by this process, the tape having a Mylar or other rigid plastic base 2, and ferric oxide particles 8 coated with samarium pentoxide 6, the particles being held together by a binder matrix 9.

FIG. 3 shows a mechanical arrangement for the mass production of the magnetic recording tape of the invention. A conventional Mylar tape 2 is stored on a dispensing spool 10. The tape 2 dispensed by the dispensing spool 10 passes under a hopper 12 which dispenses at a measured constant rate a powder mixture consisting of the samarium coated ferric oxide particles 13 and a binder agent on the upper surface of the tape 2 as the tape is driven by, the transport of the tape being supplied via a tension from a take-up spool 16 driven by conventional motor means (not shown). The powder coated tape carrying the coater powder loosely on the surface thereof then passes through a pair of sizing light pressure rollers 17 serving to distribute the powder over the face of the tape, whereupon the tape is passed through a weak magnetic field produced typically by a coil 26 to provide grain orientation to the loosely distributed powder. The tape than passes through a pair of calendering rollers 18 and 20 which serve to distribute the powder to a uniform thickness over the upper surface of the tape, the rollers also serving to impart a measure of hardness to the surface coating. The tape 2 carrying the powder then passes through a strong magnetic field source, here represented as a coil 22 disposed about the lengthwise axis of the tape, to provide a magnetic field as in the case of coil 26, with its magnetic induction vector disposed lenghtwise along the tape, the field causing the coated iron oxide particles again to line up with their major axes substantially disposed along the major axis of the tape. The use of the second coil is principally to restore to the system any orientation that was lost as a result of the burnishing action of the calendering process between rollers 18 and 20. With the coated iron oxide particles thus aligned by the field, a heater of conventional type, here shown as a simple heated plate 24 (heating means not shown) in contact with the lower surface of the tape 2 cures the adhesive bonding agent 9 (FIG. 2) to a bonding condition. Optionally, the heater may be placed within the coil 22. This latter orientation and fusion step can in some cases be eliminated, provided that the calendering process does not produce an excessive degree of disorientation, and provided that the calendering process itself by burnishing action or other means succeeds in adequately hardening the binding agent around the magnetic particles. The bonded grain-oriented tape is then wound around the takeup spool 16 in its final form.

As previously indicated, while the broadest aspect of the invention envisions the use of rare earth-containing materials other than samarium containing materials, particularly ceruim, samarium is by far the most advantageous rare earth material, and the oxide of the rare earth containing material, such as the pentoxide, is the most preferred form of the rare earth-containing material to be applied as a coating around the individual particles of ferric oxide or other magnetic recording material. A main point of novelty of the invention is to utilize a very small amount of a rare earth-containing material as a coating for the magnetic particles of a magnetic audio recording tape so that the erasability of the tape is not adversely affected but wherein the other electrical properties thereof are enhanced as a result of the ability to better orient the grains of the magnetic materials used.

I claim:

1. In an audio magnetic recording medium including a magnetic material carrier backing and a layer of a magnetic material thereover comprising magnetic particles dispersed in a binder, the improvement wherein the magnetic particles have a thin coating thereon of a rare earth-containing material, the amount of the rare earth-containing material in said recording medium being only a small percentage by weight of the coated magnetic particles so as not to adversely affect the erasability of the magnetic record to be recorded, but being of sufficient amount to improve the frequency response, signal to noise ratio, or channel separation characteristics thereof.

2. The magnetic recording medium of claim 1 wherein said rare earth-containing material includes samarium.

3. The magnetic recording medium of claim 1 wherein said rare earth-containing material is samarium pentoxide.

4. The magnetic recording medium of claim 1, wherein the amount of the rare earth-containing material in said layer is no more than about 2% of the weight of the coated magnetic particles therein.

5. The magnetic recording medium of claim 2, wherein the amount of the rare earth-containing material in said layer is no more than about 2% of the weight of the coated magnetic particles therein.

6. The magnetic recording medium of claim 3, wherein the amount of the rare earth-containing material in said layer is no more than about 2% of the weight of the coated magnetic particles therein.

7. The magnetic recording medium of claim 1, wherein the amount of rare earth-containing material in said layer is less than about 1% of the weight of the coated magnetic particles therein.

8. The magnetic recording medium of claim 2, wherein the amount of samarium-containing material in said layer is less than about 1% of the weight of the coated magnetic particles therein.

9. The magnetic recording medium of claim 3, wherein the amount of samarium pentoxide in said layer is less than about 1% of the weight of the coated magnetic particles therein.

10. The magnetic recording medium of claim 1, wherein the amount of the rare earth-containing material in said layer is about 0.5% of the weight of the coated magnetic particles.

11. The magnetic recording medium of claim 2, wherein the amount of the samarium-containing material in said layer is about 0.5% of the weight of the coated magnetic particles.

12. The magnetic recording medium of claim 3, wherein the amount of the samarium pentoxide in said layer is about 0.5% of the total weight of the coated magnetic particles.

13. A method for making an improved erasable grain-oriented magnetic audio signal recording medium, the method comprising the steps of mixing relatively small amounts of a rare earth-containing powder with a powdered magnetic material so that the rare earth-containing material is no more than about 2% by weight of the coated powder mixture and so that the rare earth-containing powder is a coating on the particles of the powdered magnetic material, coating a length of a non-magnetic carrier with said powder mixture and a hardenable binder therefor which adheres the powder mixture particles to each other and to said carrier surface, applying a magnetic field to said coating to orient said coated particles, and hardening said binder to fix the orientation of said coated particles.

14. The method of claim 13 wherein said rare earth-containing material includes samarium.

15. The method of claim 13 wherein said rare earth-containing material is samarium pentoxide.

16. The method of claim 13 wherein the amount by weight of the rare earth-containing material in proportion to the weight of the coated magnetic particles is no more than about 2%.

17. The method of claim 13 wherein the amount by weight of the rare earth-containing material in proportion to the weight of the coated magnetic particles is less than about 1%.

18. The method of claim 13 wherein the amount by weight of the rare earth-containing material in proportion to the weight of the coated magnetic particles is about 0.5%.

19. The method of claim 13 further including the step of calendering said coated carrier, and wherein said step of applying a magnetic field is performed both before and after said calendering step.

* * * * *